G. J. RICHARDSON.
COVER FOR COOKING UTENSILS.
APPLICATION FILED NOV. 6, 1920.

1,384,851. Patented July 19, 1921.

INVENTOR.
George J. Richardson
BY
ATTORNEY

UNITED STATES PATENT OFFICE.

GEORGE J. RICHARDSON, OF CERES, CALIFORNIA.

COVER FOR COOKING UTENSILS.

1,384,851.  Specification of Letters Patent.  Patented July 19, 1921.

Application filed November 6, 1920. Serial No. 422,294.

*To all whom it may concern:*

Be it known that I, GEORGE J. RICHARDSON, a citizen of the United States, residing at Ceres, county of Stanislaus, State of California, have invented certain new and useful Improvements in Covers for Cooking Utensils; and I do declare the following to be a full, clear, and exact description of the same, reference being had to the accompanying drawings, and to the characters of reference marked thereon, which form a part of this application.

This invention relates to improvements in kitchen accessories, the principal object being to provide a cover adapted to fit cooking utensils of various kinds and particularly pans and the like having a rimmed edge and which are not provided with handles, and incorporating means on the cover whereby the latter may be lifted from the utensil or both cover and utensil may be raised from the stove as a unit, without the necessity of the operator using a pad, cloth or other article to prevent being burnt by the hot pan.

I have also included in the cover escapement holes whereby the steam may escape while the food is cooking, and the water may be drained off when the pan and cover are lifted; these holes being so positioned that the steam, etc., will not be in the way of the hands of the operator when the device is to be lifted.

A further object of the invention is to produce a simple and inexpensive device, and yet one which will be exceedingly effective for the purposes which it is designed.

These objects I accomplish by means of such structure and relative arrangement of parts as will fully appear by a perusal of the following specification and claims.

In the drawings similar characters of reference indicate corresponding parts in the several views.

Figure 1:
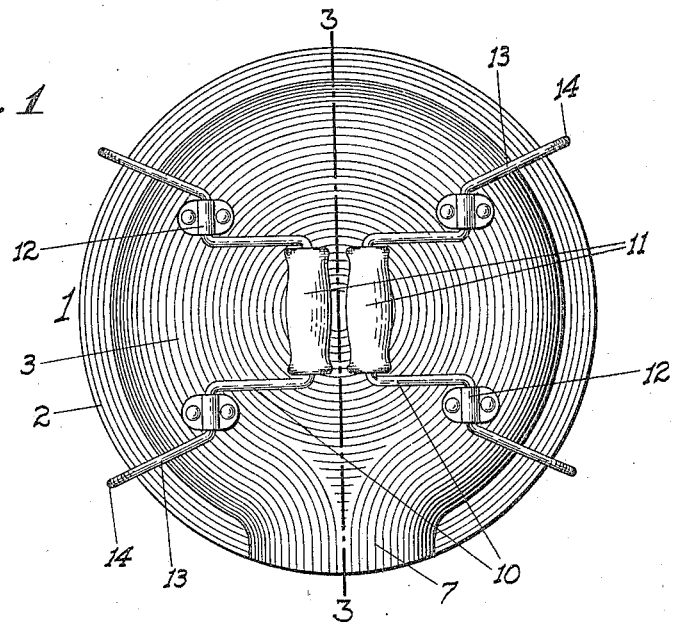
Figure 1 is a top plan view of the cover.

Referring now more particularly to the characters of reference on the drawings, the numeral 1 denotes the cover as a whole, preferably formed or pressed in one piece, having an outwardly projecting rim 2, a relatively flat dome portion 3 thereabove and a flange 4 therebelow, the latter preferably tapering inwardly somewhat to allow it to readily fit into a utensil 5 on top of which the rim 2 rests, the utensil being also provided with an outer rim 6.

A certain portion of the dome 3 extends horizontally to the outer edge of the rim 2, in preferably the shape of an arch as at 7. a vertical plate 8 provided with a plurality of holes 9 inclosing the area between the outer face of this arch and the rim 2.

Pivoted in parallel alinement on the top of the cover are a pair of U-shaped members 10, set in opposed relation with their cross-arms adjacent each other, preferably formed of small rod or stout wire, on which cross arms are mounted handles 11 of some non-heat conducting material.

Beyond the pivotal mounting 12 of these members the latter are bent substantially radial with the cover to form extensions 13 projecting beyond the rim 2, and provided on their outer ends with hooks 14 arranged to fit under the rim 6 of the utensil 5.

Figure 2:
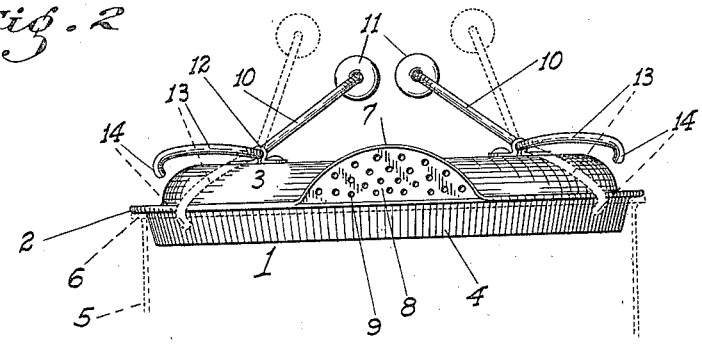
Fig. 2 is a side elevation thereof.
Figure 3:
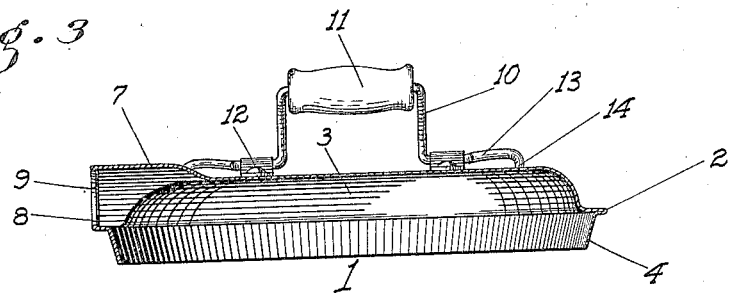
Fig. 3 is a cross section on a line 3—3 of Fig. 1.

The extension members 13 are so alined relative to the main members 10 that when the handles 11 of the latter are moved close together, the hooks will be raised clear of the rim 6, as shown in full in Figs. 1 and 2. In this position, both handles are intended to be grasped by a single hand of the operator so that they cannot spread, and the cover may then be raised by itself. If the handles however are spread apart, which means that they must be raised, the extensions 13 are of course correspondingly lowered, and the hooks 14 thereon will then pass under and engage the rim 6 of the utensil, when the cover and utensil may be raised as a unit, using both hands of course to do so.

The whole apparatus may then be tilted, and any water drained off through the holes 9, the latter being at the extreme outside edge of the cover permitting the water to be readily directed into a sink or elsewhere without its flowing down and soiling the outside of the utensil.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:—

1. A cover for a cooking utensil having an outwardly projecting rim around its upper edge, comprising a cover member, a pair of handles pivotally mounted on the cover in parallel alinement and arranged to be moved to and from each other, extensions on the handle members beyond the pivotal connections thereof, and hooks on the outer ends of the extensions arranged to project under and engage the utensil-rim when the handles are spread apart.

2. In a cover for cooking utensils, a rim thereon adapted to rest on the upper edge of the utensil, and a vertical plate fixed to said cover above the rim in the plane of the periphery of the latter and provided with drain orifices.

3. In a cover for cooking utensils, a rim thereon adapted to rest on the upper edge of the utensil, said cover being provided with a plurality of drain orifices for a certain portion of its area above the rim and in the vertical plane of the periphery thereof.

In testimony whereof I affix my signature.

GEORGE J. RICHARDSON.